(12) United States Patent
Abe et al.

(10) Patent No.: US 8,742,365 B2
(45) Date of Patent: Jun. 3, 2014

(54) ULTRAVIOLET WATER TREATMENT APPARATUS

(75) Inventors: Norimitsu Abe, Kawasaki (JP); Shinji Kobayashi, Yokohama (JP); Seiichi Murayama, Fuchu (JP); Takeshi Ide, Kokubunji (JP); Akihiko Shirota, Hachioji (JP); Takahiro Soma, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/021,185

(22) Filed: Feb. 4, 2011

(65) Prior Publication Data
US 2011/0220813 A1 Sep. 15, 2011

(30) Foreign Application Priority Data
Mar. 15, 2010 (JP) ................................. 2010-058129

(51) Int. Cl.
*H01J 37/00* (2006.01)

(52) U.S. Cl.
USPC ............ 250/455.11; 250/453.11; 250/454.11; 250/504 R

(58) Field of Classification Search
None
See application file for complete search history.

(56) References Cited

U.S. PATENT DOCUMENTS

| | | | | |
|---|---|---|---|---|
| 4,775,794 A * | 10/1988 | Behmann | ....................... | 250/373 |
| 5,124,131 A * | 6/1992 | Wekhof | ....................... | 422/186.3 |
| 5,352,359 A * | 10/1994 | Nagai et al. | ................... | 210/192 |
| 5,528,044 A * | 6/1996 | Hutchison | .................... | 250/431 |
| 5,584,411 A * | 12/1996 | Channell et al. | ........... | 220/62.19 |
| 5,660,719 A * | 8/1997 | Kurtz et al. | ..................... | 210/85 |
| 5,699,930 A * | 12/1997 | Channell et al. | ........... | 220/62.19 |
| 5,890,750 A * | 4/1999 | Channell et al. | ............... | 285/321 |
| 6,454,952 B1 * | 9/2002 | Thorpe | ....................... | 210/198.1 |
| 6,610,990 B1 * | 8/2003 | Moruzzi | ................... | 250/504 R |
| 6,863,078 B1 * | 3/2005 | Dall'Armi et al. | ........... | 134/64 R |
| 6,911,655 B2 * | 6/2005 | Snowball | ....................... | 250/431 |
| 6,976,508 B2 * | 12/2005 | Ueberall | ......................... | 138/39 |
| 7,081,636 B2 * | 7/2006 | Moruzzi | ................... | 250/504 R |
| 7,767,978 B1 * | 8/2010 | Lim | ............................. | 250/436 |
| 2004/0232358 A1 * | 11/2004 | Moruzzi | ................... | 250/504 R |
| 2007/0012883 A1 * | 1/2007 | Lam | ............................. | 250/436 |
| 2008/0203004 A1 * | 8/2008 | Abe et al. | ....................... | 210/205 |
| 2009/0291036 A1 * | 11/2009 | Chen et al. | .................. | 422/186.3 |
| 2011/0240539 A1 * | 10/2011 | Nose et al. | ..................... | 210/192 |

FOREIGN PATENT DOCUMENTS

| | | | |
|---|---|---|---|
| EP | 1371611 | | 12/2003 |
| KR | 2004052688 A | * | 6/2004 |
| WO | WO 0073213 | | 12/2000 |

OTHER PUBLICATIONS

Extended European Search Report received from European Patent Office for Application EP 11153455, mailed Aug. 4, 2011.

* cited by examiner

*Primary Examiner* — Andrew Smyth
(74) *Attorney, Agent, or Firm* — Finnegan, Henderson, Farabow, Garrett & Dunner LLP

(57) ABSTRACT

According to one embodiment, an ultraviolet water treatment apparatus includes an ultraviolet lamp unit provided with a first plumbing flange coupling on each of both ends thereof, and further provided therein with an ultraviolet irradiation tube including an ultraviolet lamp and a lamp protective tube configured to protect the ultraviolet lamp, and a cleaning device drive unit provided with a second plumbing flange coupling on each of both ends thereof and configured to drive a cleaning device configured to clean a surface of the lamp protective tube. The ultraviolet lamp unit and the cleaning device drive unit are coupled with each other on the first and second plumbing flange couplings.

8 Claims, 4 Drawing Sheets

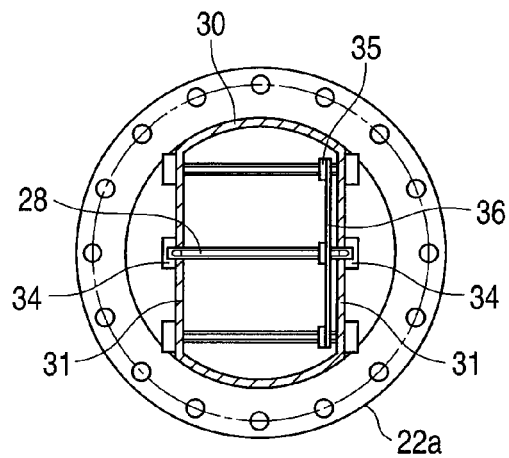
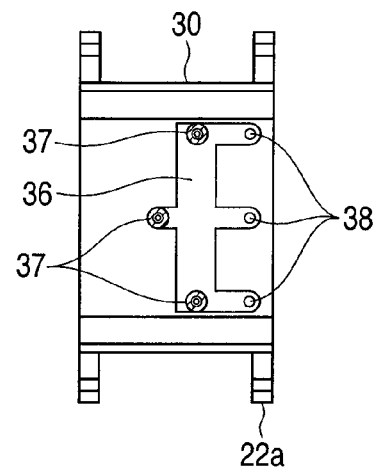
F I G. 3A        F I G. 3B
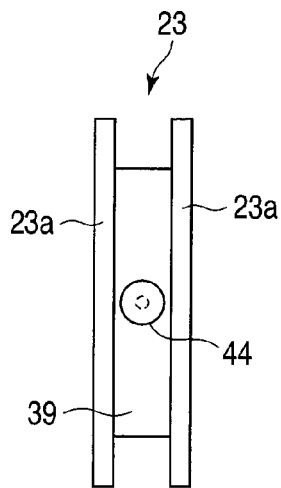
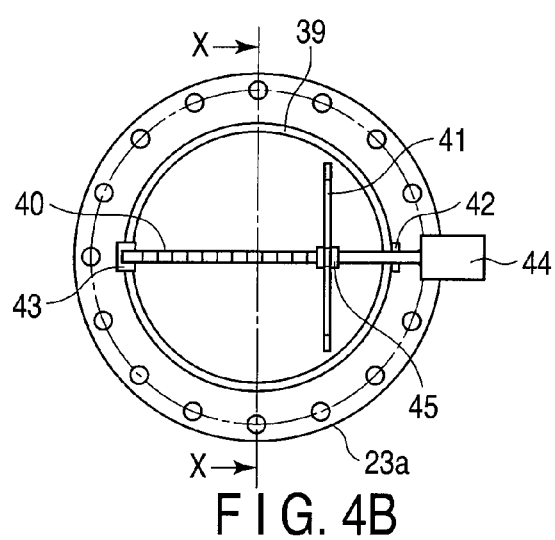
F I G. 4A        F I G. 4B
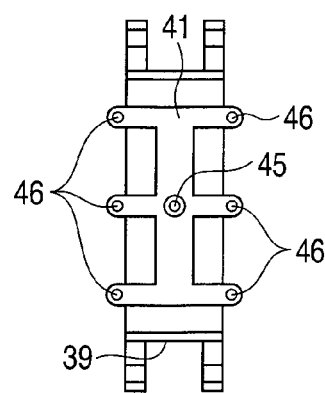
F I G. 4C

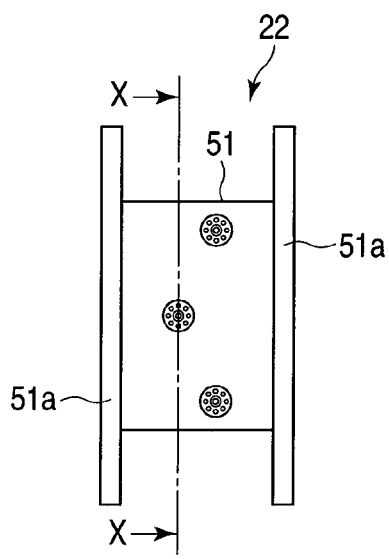
F I G. 5A
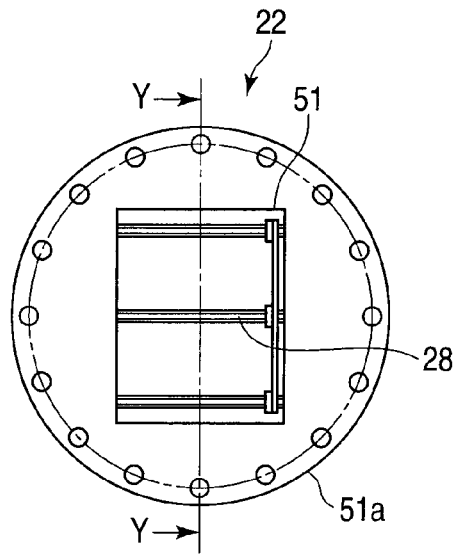
F I G. 5B
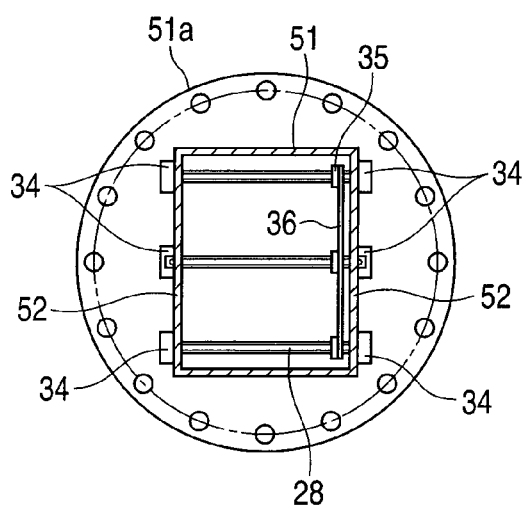
F I G. 5C
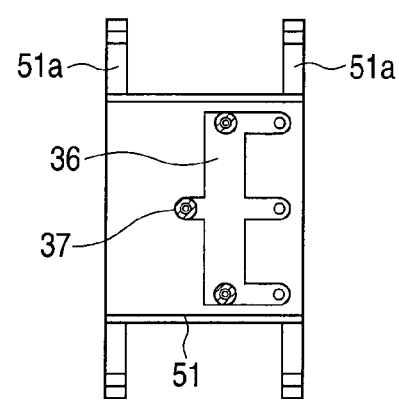
F I G. 5D

ULTRAVIOLET WATER TREATMENT APPARATUS

CROSS-REFERENCE TO RELATED APPLICATIONS

This application is based upon and claims the benefit of priority from Japanese Patent Application No. 2010-058129, filed Mar. 15, 2010; the entire contents of which are incorporated herein by reference.

FIELD

Embodiments described herein relate generally to an ultraviolet water treatment apparatus utilizing ultraviolet rays.

BACKGROUND

As is generally known, ozone or chemicals such as chlorine are used to carry out sterilization and disinfection of water supply and sewerage, sterilization, deodorization and decoloration of industrial water, bleaching of pulp, or sterilization of medical instrumentation.

In a conventional sterilizing apparatus, a retention tank and a stirring device such as a spray pump has been required in order to dissolve ozone or chemicals in the water to be treated, and thus it has not been possible to immediately cope with change in water quality or quantity. On the other hand, ultraviolet rays have a function of sterilization, disinfection and decoloration of water supply and sewerage, decomposition of persistent organic substances, deodorization and decoloration of industrial water, and bleaching of pulp, and the effect is exerted even when the irradiation time of the ultraviolet rays is several seconds or less. Thus, in an ultraviolet water treatment apparatus configured to carry out ultraviolet irradiation, when a high-intensity high-power ultraviolet lamp is used as the ultraviolet light source, the ultraviolet lamp is arranged perpendicular to a cylindrical water-passage barrel in some cases ("Maintenance Manual for Ultraviolet Treatment Facilities in Application to Water other than Surface Water" Foundation for Water Supply Technical Center, July, 2009).

FIGS. 7A and 7B show an example of an ultraviolet water treatment apparatus using a conventional high-intensity high-power ultraviolet lamp, where FIG. 7A shows a front view of the ultraviolet water treatment apparatus, and FIG. 7B shows a cross-sectional view taken along the line X-X in FIG. 7A.

The ultraviolet water treatment apparatus 1 comprises a cylindrical water-passage barrel 3 through which water to be treated flows, a lamp housing 4 joined crisscross to the cylindrical water-passage barrel 3 at a central part of the barrel 3 and having a diameter identical with the cylindrical water-passage barrel 3. In the lamp housing 4, six ultraviolet irradiation tubes 7, each having a lamp protective tube 5 made of quartz glass and a ultraviolet lamp 6 disposed in the lamp protective tube 5, are arranged at an equal interval. Each of both ends of each ultraviolet irradiation tube 7 is water-sealed on a lamp housing rid 8 by means of a watertight O-ring (not shown) and an O-ring retainer 9. Further, a cleaning device including a cleaning plate drive shaft 10, a drive screw (not shown), a drive motor 11, a cleaning plate 12 and a lamp protective tube wiper 13 is set in the lamp housing 4. In the ultraviolet water treatment apparatus 1 having such a configuration, ultraviolet lamps of the same specification are used. It should be noted that a reference symbol 14 in FIG. 7A denotes treated water.

However, since an amount of dirty substances contained in the water to be treated is large or small depending on the water treatment facilities, there has been a problem that when the type of water or the quantity of water changes, sufficient ultraviolet treatment cannot be carried out by the conventional ultraviolet water treatment apparatus.

BRIEF DESCRIPTION OF THE DRAWINGS

FIG. 3A is a cross-sectional view taken along the line X-X in FIG. 2B, and FIG. 3B is a cross-sectional view taken along the line Y-Y in FIG. 2C;

FIGS. 4A, 4B and 4C are a front view and a side view of a cleaning device drive unit for the lamp protective tube in the ultraviolet water treatment apparatus of FIG. 1, and a cross-sectional view taken along the line X-X in FIG. 4B, respectively;

FIGS. 5A, 5B, 5C and 5D are a front view and a side view of an ultraviolet water treatment apparatus according to a second embodiment, a cross-sectional view taken along the line X-X in FIG. 5A, and a cross-sectional view taken along the line Y-Y in FIG. 5B, respectively;

DETAILED DESCRIPTION

In general, according to one embodiment, an ultraviolet water treatment apparatus comprises an ultraviolet lamp unit provided with a first plumbing flange coupling on each of both ends thereof, and further provided therein with an ultraviolet irradiation tube including an ultraviolet lamp and a lamp protective tube configured to protect the ultraviolet lamp, and a cleaning device drive unit provided with a second plumbing flange coupling on each of both ends thereof and configured to drive a cleaning device configured to clean a surface of the lamp protective tube. The ultraviolet lamp unit and the cleaning device drive unit are coupled with each other on the first and second plumbing flange couplings.

Hereinafter, an ultraviolet water treatment apparatus according to this embodiment will be described below with reference to the drawings. It should be noted that this embodiment is not limited to what is described below.

First Embodiment

Figure 1:
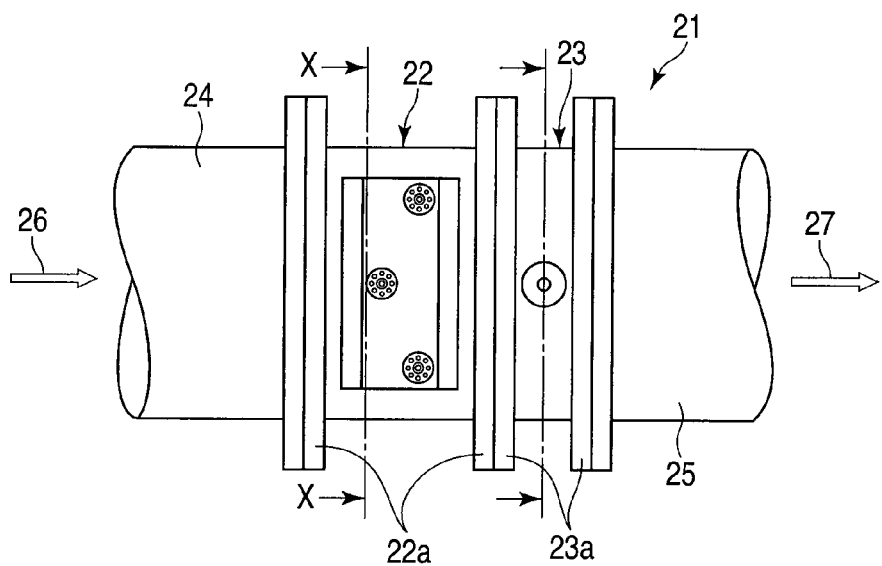
FIG. 1 is a front view of an ultraviolet water treatment apparatus according to a first embodiment.
Figure 2A:
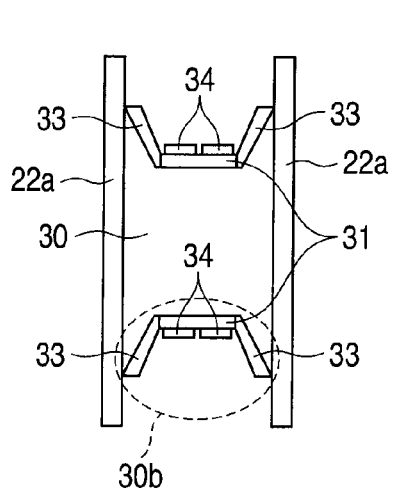
FIGS. 2A, 2B and 2C are a plan view, a front view and a side view of the ultraviolet water treatment apparatus of FIG. 1, respectively.
Figure 2B:
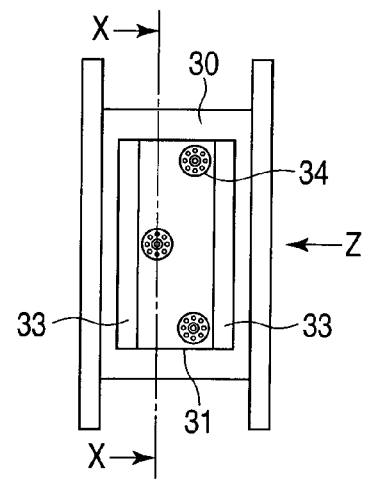
Figure 2C:
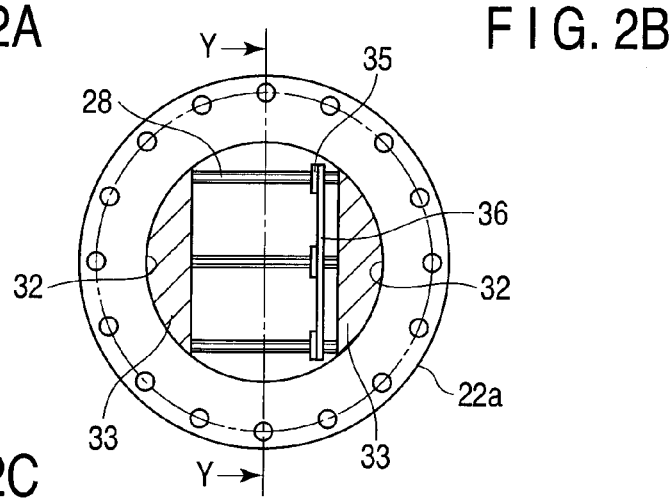

An ultraviolet water treatment apparatus according to a first embodiment will be described below with reference to FIGS. 2A, 2B, 2C, FIGS. 3A, 3B, FIGS. 4A, 4B and 4C. Here, FIG. 1 shows a front view of the ultraviolet water treatment apparatus, FIG. 2A shows a plan view of an ultraviolet lamp unit of the ultraviolet water treatment apparatus of FIG. 1, FIG. 2B shows a front view of the ultraviolet lamp unit, and FIG. 2C shows a side view viewed from a Z direction in FIG. 2B. Further, FIG. 3A shows a cross-sectional view taken along the line X-X in FIG. 2B, and FIG. 3B shows a cross-sectional view taken along the line Y-Y in FIG. 2C. Furthermore, FIG. 4A shows a front view of a lamp protective tube cleaning device drive unit of the ultraviolet water treatment apparatus of FIG. 1, FIG. 4B shows a side view thereof, and FIG. 4C shows a cross-sectional view taken along the line X-X in FIG. 4B.

The ultraviolet water treatment apparatus 21 comprises a ultraviolet lamp unit 22 provided with a first plumbing flange coupling 22a on each of both ends thereof, and a cleaning device drive unit for a lamp protective tube (hereinafter referred to as a cleaning device drive unit) 23 provided with a second plumbing flange coupling 23a on each of both ends thereof. The ultraviolet lamp unit 22 and the cleaning device drive unit 23 are coupled with each other on the first and second plumbing flange couplings by means of bolts and nuts which are not shown. Further, the ultraviolet lamp unit 22 is coupled with the water-passage pipe 24, and cleaning device drive unit 23 is coupled with the water-passage pipe 25. It should be noted that a reference symbol 26 denotes water to be treated, and reference symbol 27 denotes treated water.

The ultraviolet lamp unit 22 includes a cylindrical barrel 30 provided therein with three ultraviolet irradiation tubes 28 each of which comprises an ultraviolet lamp (not shown), and a lamp protective tube (not shown) configured to protect the ultraviolet lamp. In each of middle abdomen parts of the cylindrical barrel 30 opposed to each other, a cutout section 30b is formed. A pipe plate 31 is attached to a part of each cutout section 30b of the cylindrical barrel 30. Further, a stop plate 33 is attached to each of remaining opening parts 32 of the cutout sections 30b in such a manner that the plate 33 closes the opening part 32, and is joined to the pipe plate 31. The ultraviolet irradiation tube 28 is arranged to penetrate the barrel part of the cylindrical barrel 30, and each of both ends thereof is fixed to the pipe plate 31 watertightly by means of a watertight fixing member 34.

Wiper members 35 provided to rub surfaces of the ultraviolet irradiation tubes 28, and lamp protective tube cleaning plate 36 configured to fix the wiper members 35 are provided in the cylindrical barrel 30 as shown in FIG. 2C, FIG. 3A and FIG. 3B. The lamp protective tube cleaning plate 36 fixes the wiper members 35 by means of wiper member fixing sections 37, and is coupled with the cleaning device drive unit 23 by means of coupling sections 38 configured to couple the plate 36 to the unit 23. The lamp protective tube cleaning device comprises the wiper members 35, lamp protective tube cleaning plate 36, wiper member fixing sections 37, and coupling sections 38.

The cleaning device drive unit 23 is provided with, as shown in FIG. 4A, a cylindrical unit barrel 39 including plumbing flange couplings 23a on both ends thereof, a drive shaft 40 which penetrates both side surfaces of a middle abdomen part of the unit barrel 39, both ends of which are connected to the unit barrel 39 watertightly, and drive plate 41 attached to the drive shaft 40 to be moved in a reciprocating manner in the axial direction of the drive shaft 40. Both the ends of the drive shaft 40 are respectively fixed to a through-type bearing 42 and an enclosed-type bearing 43 watertightly, and a drive motor 44 is connected to one end part thereof. This drive motor 44 is set to operate at predetermined time intervals. The drive plate 41 is attached to the drive shaft through a drive female thread 45. Further, the drive plate 41 is provided with connection sections 46 configured to connect the plate 41 to the coupling sections 38 of the lamp protective tube cleaning plate 36.

Next, a function of the ultraviolet water treatment apparatus configured as described above will be described below.

Water to be treated 26 passes through the inside of the ultraviolet irradiation unit 22 from the left side in FIG. 1 while receiving irradiation of ultraviolet rays, and thereafter passes through the inside of the cleaning device drive unit 23 to flow out to the right side in FIG. 1 as treated water 27.

Further, when the drive motor 44 operates, the drive shaft 40 coupled with the drive motor 44 also rotates, and concomitantly with this, the drive plate 41 attached to the drive female thread 45 also carries out a reciprocating operation. Furthermore, the connection sections 46 of the drive plate 41 and coupling sections 38 of the lamp protective tube cleaning plate 36 are coupled with each other, and hence the lamp protective tube cleaning plate 36 also carries out a reciprocating operation, thereby cleaning the surfaces of the lamp protective tubes of the ultraviolet irradiation tubes 28.

According to the first embodiment, the following advantages are obtained.

(1) The ultraviolet water treatment apparatus is configured to comprise an ultraviolet lamp unit 22 provided with a plumbing flange coupling 22a on each of both ends thereof, and further provided therein with an ultraviolet irradiation tube 28 comprising an ultraviolet lamp, and a lamp protective tube, and a cleaning device drive unit 23 provided with a plumbing flange coupling 23a on each of both ends thereof, is further configured in such a manner that the ultraviolet lamp unit 22 and the cleaning device drive unit 23 are coupled with each other at the parts of the plumbing flange couplings. Therefore, even when the type of water or the quantity of water changes, it is possible to replace the ultraviolet lamp unit 22 with another ultraviolet lamp unit in a simple manner, and easily introduce the apparatus into existing water treatment facilities.

(2) By irradiating substances to be treated such as microorganisms, organic substances, and inorganic substances contained in the water to be treated 26 with ultraviolet rays while they pass through the ultraviolet irradiation unit 22, it is possible to disinfect (sterilize) or oxidatively treat the water to be treated 26.

(3) By driving the lamp protective tube cleaning device built in the ultraviolet lamp unit 22 by means of the cleaning device drive unit 23, it is possible to prevent substances contained in the water to be treated 26 from adhering to the surfaces of the ultraviolet irradiation tubes 28.

(4) The ultraviolet lamp unit 22 is provided with a cylindrical barrel 30 in which a cutout section 30b is formed in each of the middle abdomen parts opposed to each other, a pipe plate 31 attached to a part of each cutout section 30b of the cylindrical barrel 30, and a stop plate 33 attached to each of the remaining opening parts 32 to close the opening part 32, and each of both ends of each of the three ultraviolet irradiation tubes 28 is fixed to the pipe plate 31 positioned at each of the middle abdomen parts of the cylindrical barrel 30 watertightly. Accordingly, the water passage barrel width of the part at which the ultraviolet irradiation tubes 28 are provided becomes equal in the vertical direction, and even by using the ultraviolet lamps of the same specification, it is possible to apply the ultraviolet rays emitted from the ultraviolet lamps to the water to be treated 26 neither excessively nor insufficiently.

Figure 7A:
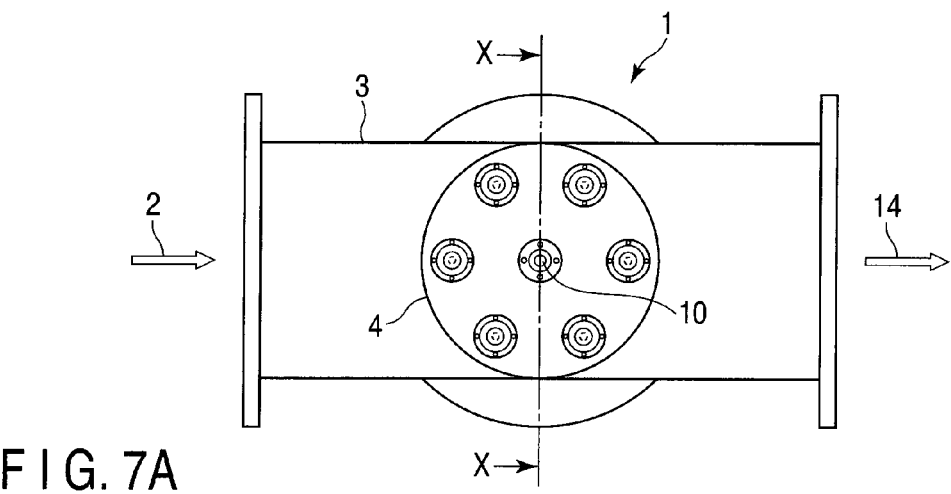
FIGS. 7A and 7B are a front view and a cross-sectional view showing an example of a conventional ultraviolet water treatment apparatus.
Figure 7B:
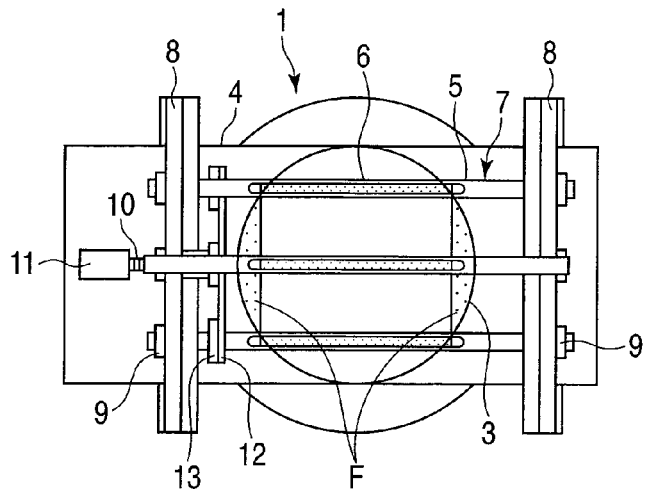

Conversely, in the case of the ultraviolet water treatment apparatus of FIGS. 7A and 7B described above, in the ultraviolet lamp, the total length of the lamp, light-emission region length, and thickness are determined by the power to be consumed by the lamp (or ultraviolet output), and hence in the case of a circular cross section such as the cylindrical water-passage barrel 3, the width is the maximum at the center line part, and becomes gradually smaller in the vertical direction of the cross section. Accordingly, when an ultraviolet lamp to be arranged is to be selected, if the lamp is selected in accordance with the vertical position width of the cross section as shown in FIG. 7B, in the lamp at the central position, the length of the light-emission area of the ultraviolet lamp becomes shorter with respect to the width of the water-passage barrel. As a result of this, the water to be treated flowing through the both end side areas F is not irradiated with a sufficient amount of ultraviolet rays.

Further, contrary to the above, when the ultraviolet lamp is selected in accordance with the width of the central part in the cross-section of the cylindrical water-passage barrel 3, the length of the ultraviolet light-emission area becomes longer with respect to the width of the cylindrical water-passage barrel 3 in the upper and lower parts in the cross-section, and hence the ultraviolet rays are uselessly applied to areas which do not contribute to the treatment of the water to be treated.

Second Embodiment

An ultraviolet water treatment apparatus according to a second embodiment will be described below with reference to FIGS. 5A, 5B, 5C, and 5D. Here, FIG. 5A shows a front view of an ultraviolet lamp unit of the ultraviolet water treatment apparatus, FIG. 5B shows a side view, FIG. 5C shows a cross-sectional view taken along the line X-X in FIG. 5A, and FIG. 5D shows a cross-sectional view taken along the line Y-Y in FIG. 5B. However, the same members as the other drawings are denoted by the same reference symbols, and a description of them will be omitted.

A reference symbol 51 in the drawings denotes a rectangular body including plumbing flange couplings 51a on both ends thereof. On both side surface sections 52 opposed to each other of the rectangular body 51, three ultraviolet irradiation tubes 28 are arranged in such a manner that the ultraviolet irradiation tubes 28 penetrate both the side surface sections 52 to protrude from the side surface sections 52. Both ends of each of the ultraviolet irradiation tubes 28 are fixed to the side surface sections 52 watertightly by means of watertight fixing members 34.

In the ultraviolet water treatment apparatus configured as described above, water to be treated receives irradiation of ultraviolet rays from the ultraviolet irradiation tubes 28 provided therein while the water passes through the inside of the rectangular body 51. Thereafter, the water passes through the inside of a cleaning device drive unit to flow out as treated water. It should be noted that cleaning of lamp protective tube surfaces of the ultraviolet irradiation tubes 28 carried out by a lamp protective tube cleaning device is identical with the case of the first embodiment.

According to the second embodiment, the flow-path cross section of the ultraviolet lamp unit through which the water to be treated flows has a simple rectangular shape, and hence it is possible to apply the ultraviolet rays emitted from the ultraviolet lamps to the water to be treated without waste and loss. Further, by virtue of the rectangular cross section, the flow path becomes equal in the vertical direction, and even by using the ultraviolet lamps of the same specification, it is possible to apply the ultraviolet rays emitted from the ultraviolet lamps to the water to be treated without waste and loss.

It should be noted that in the second embodiment, although a circular pipe is used as the water-passage pipe to be coupled with the ultraviolet lamp unit, a rectangular water-passage pipe can also be used.

Third Embodiment

Figure 6:
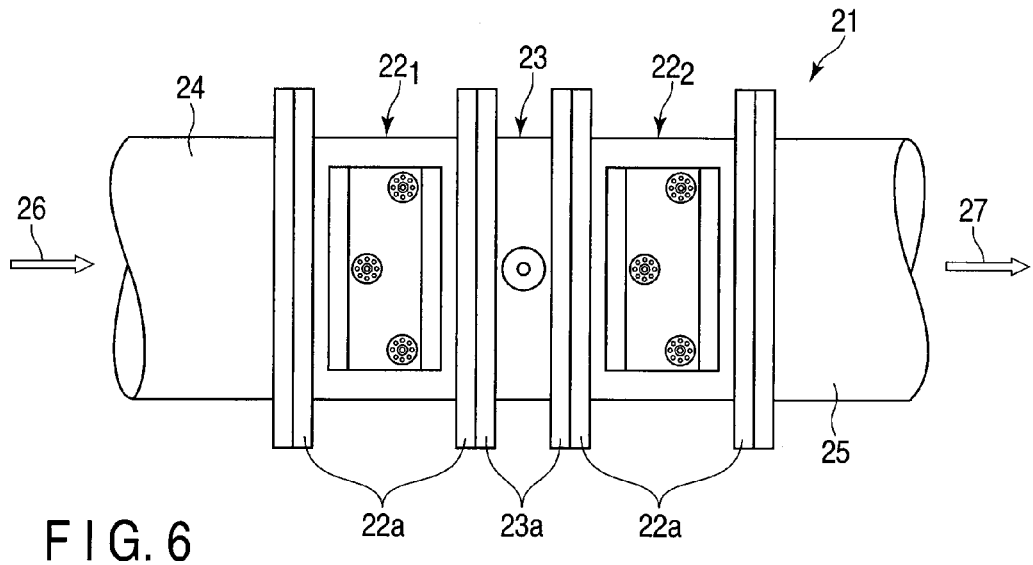
FIG. 6 is a view of an ultraviolet water treatment apparatus according to a third embodiment.

An ultraviolet water treatment apparatus according to a third embodiment will be described below with reference to FIG. 6. However, the same members as those in FIG. 1 are denoted by the same reference symbols, and a description of them will be omitted.

This embodiment is characterized in that one cleaning device drive unit 23 is arranged between the first and second ultraviolet lamp units $22_1$ and $22_2$, and all the units $22_1$, 23, and $22_2$ are coupled with each other on the flange couplings.

According to the third embodiment, even in facilities in which an ultraviolet irradiation amount necessary for the treatment exceeds that of one ultraviolet lamp unit depending on the condition of the water to be treated, it is possible to easily carry out ultraviolet treatment by using another ultraviolet lamp unit. Further, by operating the lamp protective tube cleaning plate built in each of the two ultraviolet lamp units $22_1$ and $22_2$ by using one cleaning device drive unit 23, it is possible to make the configuration of the apparatus compact.

It should be noted that the ultraviolet irradiation tubes are not limited to the above-mentioned three ones. Further, the combination of the ultraviolet lamp unit and cleaning device drive unit is not limited to that of the contents described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultraviolet water treatment apparatus comprising:
an ultraviolet lamp unit including a first cylindrical barrel provided with a first plumbing flange coupling on each of both ends thereof, and further provided therein with an ultraviolet irradiation tube including an ultraviolet lamp and a lamp protective tube configured to protect the ultraviolet lamp; and
a cleaning device drive unit including a second cylindrical barrel provided with a second plumbing flange coupling on each of both ends thereof and configured to drive a cleaning device configured to clean a surface of the lamp protective tube,
wherein the first cylindrical barrel and the second cylindrical barrel are separated from each other and the ultraviolet lamp unit and the cleaning device drive unit are coupled with each other on the first and second plumbing flange couplings, and wherein a first water-passage pipe, the ultraviolet lamp unit, the cleaning device drive unit and a second water-passage pipe are linearly arranged to flow water linearly, in which the ultraviolet irradiation tube is arranged perpendicularly to a flow direction of water in the ultraviolet lamp unit.

2. The apparatus according to claim 1, wherein the ultraviolet lamp unit includes the first cylindrical barrel provided with the first plumbing flange coupling on each of both ends thereof and further provided therein with the ultraviolet irradiation tube, the first cylindrical barrel having a cutout section formed in each of middle abdomen parts thereof opposed to each other, a pipe plate attached to a part of each of the cutout sections of the first cylindrical barrel, and a stop plate attached to each of remaining opening parts of the cutout sections to close the opening part, and wherein the ultraviolet irradiation tube is arranged to penetrate the first cylindrical barrel, and each of both ends thereof is fixed to the pipe plate watertightly.

3. The apparatus according to claim 1, wherein the ultraviolet lamp unit includes a rectangular body provided with a first plumbing flange coupling on each of both ends thereof and further provided therein with an ultraviolet irradiation tube, and wherein the ultraviolet irradiation tube is arranged to penetrate the rectangular body, and both ends thereof are fixed to side surface sections of the rectangular body opposed to each other watertightly.

4. The apparatus according to claim 1, further comprising a cleaning device including a wiper member provided to rub the surface of the ultraviolet irradiation tube, a lamp protective tube cleaning plate configured to fix the wiper member, and a coupling section configured to couple the lamp protective tube cleaning plate to the cleaning device drive unit.

5. The apparatus according to claim 1, wherein the cleaning device drive unit includes the second cylindrical unit barrel provided with a second plumbing flange coupling on each of both ends thereof, a drive shaft which penetrates both side surfaces of a middle abdomen part of the second cylindrical barrel, both ends of which are connected to the second cylindrical barrel watertightly, and a drive plate attached to the drive shaft to be moved in a reciprocating manner in the axial direction of the drive shaft.

6. The apparatus according to claim 1, wherein one cleaning device drive unit is coupled with a plurality of ultraviolet lamp units.

7. The apparatus according to claim 1, wherein the ultraviolet lamp unit is provided with a plurality of ultraviolet irradiation tubes.

8. The apparatus according to claim 1, wherein the ultraviolet lamp unit is replaceable with another ultraviolet lamp unit.

\* \* \* \* \*